United States Patent Office 3,482,985
Patented Dec. 9, 1969

3,482,985
METHOD OF MAKING ANIMAL FOOD
Hovey M. Burgess, Greenwich, Conn., and Robert W. Mellentin, Battle Creek, Mich., assignors to General Foods Corporation, White Plains, N.Y., a corporation of Delaware
No Drawing. Continuation-in-part of application Ser. No. 295,604, July 15, 1963. This application Aug. 23, 1965, Ser. No. 486,586
The portion of the term of the patent subsequent to Aug. 24, 1982, has been disclaimed
(Filed under Rule 47(a) and 35 U.S.C. 116)
Int. Cl. A23k 1/10, 1/14
U.S. Cl. 99—2                    9 Claims This application is a continuation-in-part of co-pending U.S. patent application, Serial No. 295,604, filed July 15, 1963, for Animal Food and Method of Making Same, issued as U.S. Patent No. 3,202,514, which application was a cotninuation-in-part of prior abandoned applications Ser. No. 829,510, filed July 27, 1959 and Ser. No. 216,723, filed Aug. 14, 1962 as a continuation-in-part of said application Ser. No. 829,510.

This invention relates to a novel food for carnivorous animals and to a method of making the same. More specifically, it relates to a novel dog food particularly characterized by high nutritional value and extended storage life.

As is well known to those skilled-in-the-art, animal foods, and particularly dog foods, are commonly prepared for the consumer in two forms: the meal type particularly characterized by its dry more-or-less cereal-like texture and by its low moisture content, typically about 10%; and the canned type particularly characterized by its more-or-less meat-like texture and by its high moisture content, typically as high as 75%.

The meal-type feeds generally have a very high nutritional and caloric value and an extended period of storage life. However, the palatability of most typical dry dog foods is rather low. In many cases, the animals will not eat them in dry form, and it is usually necessary to add liquids thereto. When this is done, the mixture commonly becomes mushy or doughy and generally unsatisfactory to the dog with the result that it is not eaten if there be other foods available.

Canned-type dog foods, on the other hand, are generally received very favorably by dogs—they possess a very high degree of palatability. However, the storage characteristics of these products is such that they require packing and storing in sealed cans which creates a considerable portion of the cost. Further, once a can is opened, it must be quickly consumed, or it deteriorates unless stored under refrigeration.

It is an object of this invention to prepare a novel-type animal food characterized by a very high palatability, a long shelf life when stored under non-refrigerated conditions, and a high nutritional content. Other objects will be apparent to those skilled-in-the-art on inspection of the following description.

In accordance with certain of its aspects, the animal food of this invention, characterized by high palatability, high nutritional content, and extended shelf life is formulated by a process which comprises formulating a mixture of pasteurized meat, water in amounts sufficient to impart plasticity to the product, soluble solids in amount greater than the bacteriostatic amount and a water adsorbant. Formulation of a complete product preferably also includes incorporation thereinto of a protein balancing agent to provide a balanced selection of proteins; an anti-mycotic to minimize growth of mold or fungi; and desired additional materials to modify or impart flavor, color, mineral content, vitamins, etc.

The meat which may be used in formation of this novel product includes any desired cut of meat, including meat by-products and variety meats, as well as poultry and poultry by-products or fish and fish by-products. Commonly the meat component, which contributes much of the flavor appeal and palatability of the product, will be beef, e.g., beef tripe, trimmings, etc. In the preferred embodiment, the meat content may be as much as, e.g., 35% of the total weight of the product. Commonly it may be 25%–35% and in a typical product, it may, for example, be 30%–32%.

The meat content of the product will form a matrix with which the other components of the product will be combined. The raw material meat may be in any desired form, but when it has been processed, as hereinafter described, it may be in finely divided particulate form or more pdeferably in more-or-less liquid form.

The water content of the product may be sufficient to impart plasticity, i.e., to permit the product to be readily formed, mixed, pressed, molded, etc. Preferably the water content will be as low as 16%–17% or as high as 26%–27%. Most desirably it will be maintained more-or-less fixedly at about 25%. A water content substantially above this preferred range makes the product too mushy and non-handleable, and cuts down considerably on shelf life, while lower moisture contents do not permit attainment of desired plasticity. The water content of the product may be provided by added water, but more commonly it will be obtained from the components of the mixture, typically the meat, which may contain 70% moisture or the sugar which may contain, e.g., 10% moisture.

The soluble solids which may be used in practice of this invention may preferably include any of the common sugars which are soluble in the aqueous phase of the product in amount sufficient to impart thereto a bacteriostatic action. Commonly those preferred soluble solids, e.g., sugars may have a solubility in water to the extent that they provide a concentration at the levels used to produce the desired bacteriostatic effect. The sugars may include mono- and di-saccharides, typically dextrose or sucrose. The sugar will be present at least in bacteriostatic amount. Commonly the desired product will contain 20%–35% sugar, although higher levels may be used.

The novel product of this invention, when prepared in manner hereinafter disclosed, is characterized by its substantially complete resistance to bacterial decomposition. However, because of its high nutritive content, it may serve as a desirable host for fungi, yeasts, or mold. Accordingly the preferred embodiment of this invention includes an anti-mycotic agent to minimize fungi or mold growth. Although sorbic acid may be so employed, it is preferred to use potassium sorbate or other sorbate salt. Preferred amount of anti-mycotic agent may vary but typically it may be about 0.5% of the total weight. Anti-mycotics which can be used are sorbic acid, potassium and calcium sorbate.

In the preferred embodiment of this invention, the desired product includes a vegetable protein concentrate, in addition to the meat, sugar, and water mixture. This concentrate raises the total protein level of the mixture to the desired nutritive level while simultaneously contributing to the water adsorbent properties and to the appearance of the product. Vegetable protein concentrates which may be employed (as the term is used herein) include oil seeds and legumes. Typical vegetable protein concentrates include soy flakes (the preferred concentrate), as well as concentrates derived from cottonseed, peanuts, flaxseed, beans, etc.

The preferred vegetable protein concentrate is soy flakes. These materials in addition to their contribution to the nutritional content of the product and to its water adsorptive and plastic properties, may also provide a desirable appearance by forming in the product whitish fat-like spots which (when viewed with the predominatly red body of other material) produces an appearance very closely resembling ground beef containing natural fat.

Typically the vegetable protein concentrate may be present in amount of 25%–40%, say 30%. The vegetable protein concentrate may be present in the form of a mixture of flakes and flour, and when this mixture is employed, e.g., it may include 20%–30%, say 20% soy flour and 5%–10%, say 10% soy flakes.

In a preferred embodiment of this invention, a product may contain 25%–35%, say about 32% meat; 20%–35%, say about 26% sugar; 25%–40%, say about 35% vegetable protein concentrate and water in amount of 17%–27%, say 25%. In this embodiment, as elsewhere in this specification, the water content is given in terms of percentage of the total wet weight of the product. More specifically, 100% product weight is obtained from the, e.g., charge meat; soluble solids, e.g., sugar; and vegetable protein concentrate (each of which contains water) and the percent water is measured in terms of percentage of this total net weight.

The preferred embodiment also includes a protein-balancing agent, typically skim milk solids, which provides a supply of protein sufficient in amount and distribution to raise the level of proteins and to supply those proteins which are not provided by other sources. Use of protein-balancing agents permits attainment of a product having a complete protein required for proper nutrition. Preferably the protein balancing agent may be present in amount of, e.g., up to about 5%.

Other preferred ingredients in the product include: desired flavors including meat fat, salt, etc.; nutrients including vitamins, minerals, etc.; and a red dye, preferably F D & C Red #2, to give the desired color. Other appropriate dyes may be employed. The flavor may be present in amount as great as 2%–3%, and commonly the others, in total, comprise about 1% or less.

In practice of one embodiment of this invention, the meat component of the charge may be pasturized at, e.g., 180° F.–212° F., say 200° F., for 5 to 15 minutes, say 10 minutes, to kill bacteria and to produce a liquified meat. To this mixture, preferably maintained at about the same temperature, may be added the flavors, nutrients, colors, and anti-mycotic agent. The vegetable protein may commonly be added to the slurry and the mixture may be maintained at temperature sufficiently high to effect gelatinization of starch, commonly at above 150° F. and typically at 150° F.–160° F. for 5–10 minutes.

The so-finished mixture, when uniform, may be packaged by wrapping. It is a feature of this invention that the product may be packed in moisture-impermeable wrappers and that no sterilization is required. Preferably, however, the product may be cut into patty form, i.e., cylinders about 3.5 inches in diameter and, e.g., 0.75 inch thick, weighing about three oz.

It is preferred, however, to extrude the finished mixture, at low pressure and at temperature low enough to eliminate stickiness, into small cylinders typically 0.125 to 0.25 inch in diameter, more commonly 0.1875 (i.e., about 3/16) inch and having a length which may range from 0.25 to 1.0 inch, commonly about 0.5 inch. Extrusion may be effected in, e.g., an Enterprise extruder or a Buffalo meat grinder, etc.

The so-extruded cylinders may be molded under low pressure into hamburger-like patties, typically 3.5 inches in diameter, 0.75 inch in thickness, and weighing about three oz.

The so-prepared product may be characterized by a completely meat-like appearance, color, consistency, texture, and general handleability.

This novel product is particularly characterized by its extended storage life. Under normal ambient conditions, it may be stored indefinitely without any great degree of protection. A loose moisture-impermeable wrapping is sufficient to protect the product against bacteria and against all common molds or fungi. It needs no refrigeration.

The density of the product will depend on the technique of fabrication including the degree of pressure used to form the patties. Typically the density will be 45–70 pounds per cubic foot and most commonly about 50 pounds per cubic foot for patties. It is apparent that the bulk density of the product may be controlled.

It is particularly significant that the product of this invention is fully as palatable (i.e., as well liked by dogs) as is the best canned dog food—this being far in excess of the generally low palatability of receptiveness of dry foods.

A specific example of the process of this invention may be as follows: A mixture comprising 18.4 pounds of scalded beef tripe, 6.1 pounds of rough tongue gullets, and 6.1 pounds of beef cheek trimmings was placed in a double jacketed sigma mixer and heated to 212° F. with indirect steam over a period of 10 minutes. To the liquified meat was added 0.5 pound of potassium sorbate, 0.2 pound of garlic oil, 2 pounds of tallow, 0.6 pound of salt, 0.25 pound of dicalcium phosphate, 0.6 pound of vitamin premix, 0.001 pound of cobalt sulfate, and 0.005 pound of Red Dye No. 2. Mixing continued during the addition as the temperature of the mix was maintained at about 200° F.–212° F.

Untoasted soya flakes (31.5 pounds) were added to the liquid with stirring at temperature of about 180° F. and the resulting thick mixture was stirred for about 5–10 minutes during which time the starch gelatinized to some extent. 25.9 pounds of Frodex (a commercial mixture containing 42% dextrose) and 5.1 pounds of dried skim milk were added to the mixture, and subsequently (after about 3–4 minutes at about 200° F.) 3.5 pounds of flaked soybean hulls were added.

The mixture was thoroughly blended and then extruded through a low temperature, low pressure Enterprise extruder having a round 0.1875 inch diameter nozzle. The extruded cylinder was cut into lengths of about 0.5 inch and the lengths were then formed by low pressure into three-ounce patties having a diameter of 3.5 inches and a thickness of 0.75 inch.

The so-prepared products had a moisture content of about 25%, a protein content of about 22%, and a fully balanced measure of other desired nutritional ingredients. It was highly palatable and had an extended storage life in the absence of refrigeration.

Although this invention has been described with reference to specific examples, it will be obvious to those skilled-in-the-art that various modifications may be made thereto which come within the scope of this invention.

What is claimed is:

1. Process for manufacturing a palatable moist animal food comprising proteinaceous meaty matrix material, added sugar solids, and as a water adsorbant a vegetable material which comprises the steps of subjecting said matrix material, a sorbic acid compound and said added sugar solids to heat and mixing together with said vegetable material in the presence of 16–17% to 26–27% water by weight of the mixture for a period of time sufficient to pasteurize the meat to form an aqueous solution of the water soluble solids of said mixture and to disperse said solution uniformly throughout said meaty matrix materials and vegetable materials and hydrate same and thereby form a plastic composition wherein said soluble solids are at a level in solution providing bacteriostatic stabilization, the weight level of said sugar being 20–35% and the weight level of said vegetable material being 25–40%; and forming said composition into a desired shape by extruding the finished mixture into cylinders at a lower temperature and packaging said cylinders in a loose moisture impermeable wrapper.

2. Process according to claim 1 wherein said sorbic acid compound is potassium sorbate.

3. Process according to claim 1 wherein said meaty material is in a finely divided particulate form in said mixture and said vegetable material includes protein vegetable concentrate.

4. Process according to claim 1 wherein said vegetable material is maintained during mixing at a temperature sufficiently high to effect gelatinization of starch therein.

5. Process for manufacturing a palatable moist animal food product comprising subjecting raw meat and added sugar solids which are soluble in the aqueous phase of the product to an elevated meat pasteurization temperature in the presence of a sorbic acid compound whereby the water content of the meat-sugar mixture is liberated therefrom and serves to provide moisture to said mixture, the water content of the product ranging from 16–17% to 26–27%; incorporating a vegetable material in said mixture to adsorb the moisture content thereof and thereby provide a plastic extrudable composition; the weight level of said sugar solids added to said mixture being 20–35% and in amount sufficient to impart a bacteriostatic action thereto; and forming said composition into a desired shape by extruding the finished mixture into cylinders at a lower temperature and packaging said cylinders in a loose moisture impermeable wrapper.

6. Process according to claim 5 wherein the meat component of the mixture is pasteurized at a temperature in excess of 180° F. to kill bacteria and thereby liquify the meat and wherein the vegetable material is maintained at a temperature sufficiently high to effect gelatinization of the satrch therein, and wherein the thus treated mixture is extruded into a desired shape and packaged in a loose wrapping material without sterilization.

7. Process according to claim 6 wherein the meat content ranges from 25–35% by weight of said composition, and wherein said vegetable material is present at a level of 25–40% by weight the level of said sorbic acid compound being about 0.5% by weight of said composition.

8. Method of manufacturing a meat-like meat-containing product having the color, consistency, texture and general handleability of meat which comprises steps of subjecting fresh meat and soluble sugar solids selected from the class consisting of mono- and di-saccharides to a pasteurizing temperature of 180° F.–212° F. for 5–10 minutes to kill bacteria and to produce a liquified meat, adding a meat coloring and a sorbic acid compound to said mixture, and mixing with said mixture a vegetable material maintained at a temperature sufficiently high to effect gelatinization of the starch content thereof and in excess of 150° F. for a period of 5–10 minutes, said mixture of pasteurized meat, sugar solids and said other added ingredients having a moisture content ranging between a lower limit of 16–17% and an upper limit of 26–27%, the water content of the product thus produced being obtained from the components of the mixture of meat and sugar solids and being adsorbed by said vegetable material during said processing to gelatinize the starch content thereof, the water soluble solids being present in the product produced by said processing at a concentration sufficient to impart bacteriostatic action to the pasteurized and gelatinized materials, extruding the thus-treated mixture into products of desired shape at a lower temperature, molding the extrudates into hamburger-like patties and packing said patties in a wrapper without sterilization.

9. Method according to claim 8 wherein soy flakes are distributed as part of said vegetable material throughout the mixture during said mixing.

References Cited

UNITED STATES PATENTS

| 2,379,294 | 6/1945  | Gooding       | 99—171 |
| 2,434,388 | 1/1948  | Brehm         | 99—7   |
| 2,532,489 | 12/1950 | Ferguson      | 99—169 |
| 2,774,670 | 12/1956 | Albert        | 99—2   |
| 2,957,770 | 10/1960 | Freund et al. | 99—107 |
| 2,965,489 | 12/1960 | Clickner      | 99—9   |
| 3,115,409 | 12/1963 | Hallinan et al. | 99—2 |
| 3,202,514 | 8/1965  | Burgess et al. | 99—2  |

FOREIGN PATENTS 560,490   7/1958   Great Britain.

OTHER REFERENCES

Seiden et al., Feedstuffs, pp. 290–292, Springer Publishing Co., Inc., New York, N.Y. (1957).

A. LOUIS MONACELL, Primary Examiner

J. M. HUNTER, Assistant Examiner

U.S. Cl. X.R.

99—7, 14, 18